United States Patent [19]

Papuchon et al.

[11] Patent Number: 4,468,085

[45] Date of Patent: Aug. 28, 1984

[54] HYBRID OPTICAL JUNCTION AND ITS USE IN A LOOP INTERFEROMETER

[75] Inventors: Michel Papuchon; Hervé J. Arditty; Claude Puech, all of Paris, France

[73] Assignee: Thomson-CSF, Paris, France

[21] Appl. No.: 307,933

[22] Filed: Oct. 2, 1981

[30] Foreign Application Priority Data

Oct. 10, 1980 [FR] France ............................ 80 21677

[51] Int. Cl.³ ............................................. G02B 5/174
[52] U.S. Cl. ............................... 350/96.14; 350/96.11; 350/96.15; 356/350
[58] Field of Search ............... 350/96.11, 96.12, 96.13, 350/96.14, 96.15; 356/349, 350, 351

[56] References Cited

U.S. PATENT DOCUMENTS 3,920,314  11/1975  Yajima ............................ 350/96.12
4,165,225  8/1979  Auracher et al. ............ 350/96.15 X
4,196,964  4/1980  Papuchon ........................ 350/96.14
4,273,445  6/1981  Thompson et al. ................ 356/350

OTHER PUBLICATIONS

Rollke et al., "Metal-Clad Waveguide As Cutoff Polarizer For . . . ", *IEEE J.Q.E.*, vol. QE-13, No. 4, Apr. 1977, pp. 141-145.
Murakami et al., "Single-Mode Optical Y-Branching Circuit Using . . . ", *Electron. Lett.*, vol. 17, No. 12, Jun. 1981, pp. 411-413.

*Primary Examiner*—John D. Lee
*Attorney, Agent, or Firm*—Cushman, Darby & Cushman

[57] ABSTRACT

An integrated optical device including at least one hybrid optical junction with two input paths and two output paths, for transmitting light energy from the input to the output paths as a function of phase difference between the inputs. The junction includes a Y-shaped node formed by three monomodal optical waveguides situated in a refractive medium with a lower refractive index than that of the three wave-guides.

13 Claims, 6 Drawing Figures

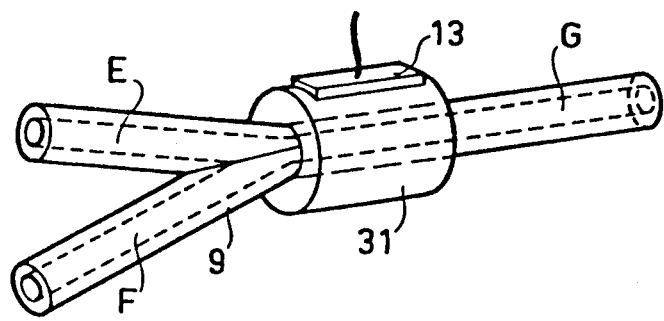
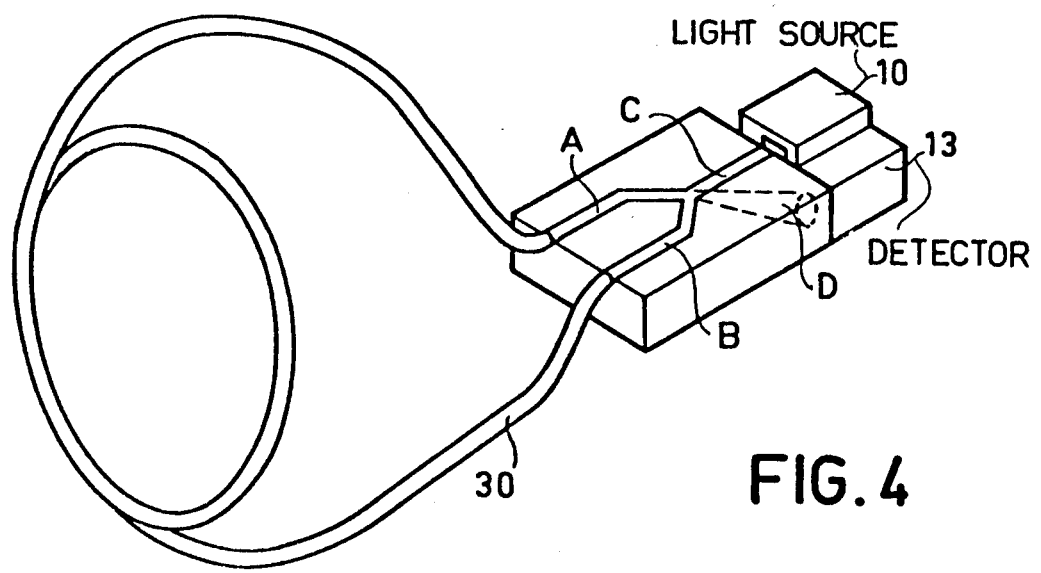

HYBRID OPTICAL JUNCTION AND ITS USE IN A LOOP INTERFEROMETER

BACKGROUND OF THE INVENTION

This invention is related to optical guided-transmission devices, particularly for use in integrated optical systems. An integrated guide is obtained by creating, in a substrate with a refractive index of $n_0$, a zone in which the refractive index is more than $n_0$. Integrated optical devices offer many advantages over conventional optical systems; they require no alignment, are perfectly stable, take up less space, remove the problem of vibrations, and provide an opportunity of achieving ultimate performance, by enabling light to be guided throughout its path. It is useful to be able to switch rays from one guide to another, in order to guide optical rays along several paths. Hybrid junctions are sometimes constructed using the principle of the directional coupler. This is a selector device comprising two wave-guides, made from an electro-optical material, and separated by another material, with a lower refractive index than the electro-optical material, by a distance of a few micrometers, so that a beam can be transfered from one guide to another. The refractive index of the two guides is altered in the reverse direction by the effect of an electrical field, thereby altering the length of the coupling and consequently the fraction of light energy passing from the first guide to the second. Such structures require a very high degree of geometrical precision, since a large number of variables have a critical importance for the length of the coupling; the interguide distance, in particular, has to be very strictly respected.

The new guide-transmission device described herein comprises two monomodal optical wave-guides which converge in a node from which a third monomodal guide starts. The three branches form a Y shape. The first two branches act as hybrid optical junction inputs, and the third branch acts as the first output, the second output being an integral transmission path inside the surrounding material. Such a junction accordingly forms an extremely simple integrated optical circuit. It is used primarily, but not exclusively in optical interferometers, which contain a number of beam separators that can be provided by these hybrid junctions. They may also contain phase modulators, which can be incorporated in the same circuits as the junctions.

SUMMARY OF THE INVENTION

The invention provides an integrated optical device comprising at least one integrated hybrid junction with two input paths and two output paths. Each junction comprises a Y-shaped assembly of three monomodal optical wave-guides situated inside a refractive medium having a lower refractive index than that of the waveguides, the ends of these three branches forming two inputs and one output, a second output being formed of a portion of the refractive medium, linking the node of the three wave-guides to an output facet of the refractive medium containing the junction.

BRIEF DESCRIPTION OF THE DRAWINGS

Further advantages and features of the invention will appear from the following description of certain possible embodiments, with reference to the accompanying illustrations wherein:

FIGS. 2 and 3, show alternative embodiments of the invention;

FIG. 4, shows the use of an optical device according to the present invention in a loop interferometer;

DETAILED DESCRIPTION OF A PREFERRED EMBODIMENT

Figure 1:
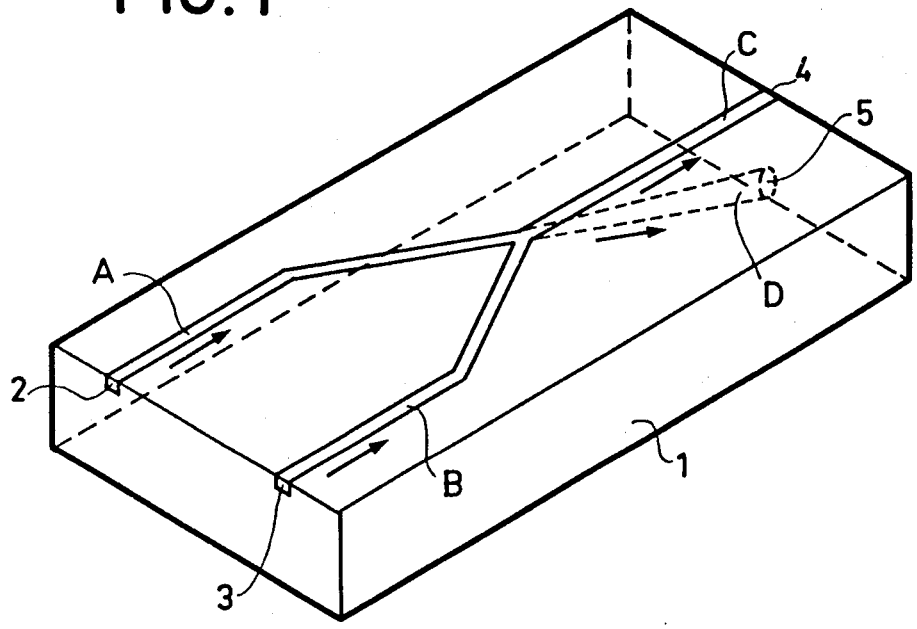
FIG. 1, shows one embodiment of the invention.

The new integrated optical circuit described here is formed of a guide structure containing only monomodal guides. As shown in FIG. 1, it comprises a Y-shaped node. This circuit is made from a substrate, which may be an electro-optical substrate such as a plate of lithium niobate ($LiNbO_3$) or lithium tantalate ($LiTaO_3$). Light guides may be produced on such substrates by diffusing metal ions, either titanium or niobium, which increases the refractive index of the zone where such diffusion occurs, thereby forming the wave-guide. The structure is built up by using masking techniques similar to those employed in manufacturing semi-conductors. Optical paths are provided by two guides, coming from two input points 2 and 3, converging in a node from which emerges a third guide connected to output point 4.

The device functions in a perfectly straightforward way, given the principles of propagation of light in a junction consisting of monomodal guides. The node acts as a separator, like a semi-transparent screen with two inputs and two outputs. These four paths are quite obvious in a semi-transparent screen, but FIG. 1 shows that four such paths also exist in the node illustrated there. In addition to the three obvious paths consisting of the monomodal guides A, B and C, there is also a fourth path D, corresponding to a wave leaking into the substrate. This separator can also be regarded as a hybrid junction; if the waves being propagated along A and B are in phase when they reach the level of the node, they will excite the mode of guide C, and all energy will be transferred into this guide. On the other hand, if they are exactly opposed (out of phase), it is as if one were trying to excite an anti-symmetrical mode in guide C (a higher order of mode), which is at the break in the monomodal guide. The corresponding energy therefore leaks into the substrate along track D. This phenomenon has been proven experimentally. When dephasing between the two waves passing through the guides A and B is between these two extremes, part of the energy is transferred into guide C, and the remainder leaks into the substrate along path D. The separate ends of the various optical paths A, B, C and D therefore form the two input points 2 and 3 and the two output points 4 and 5.

Figure 2:
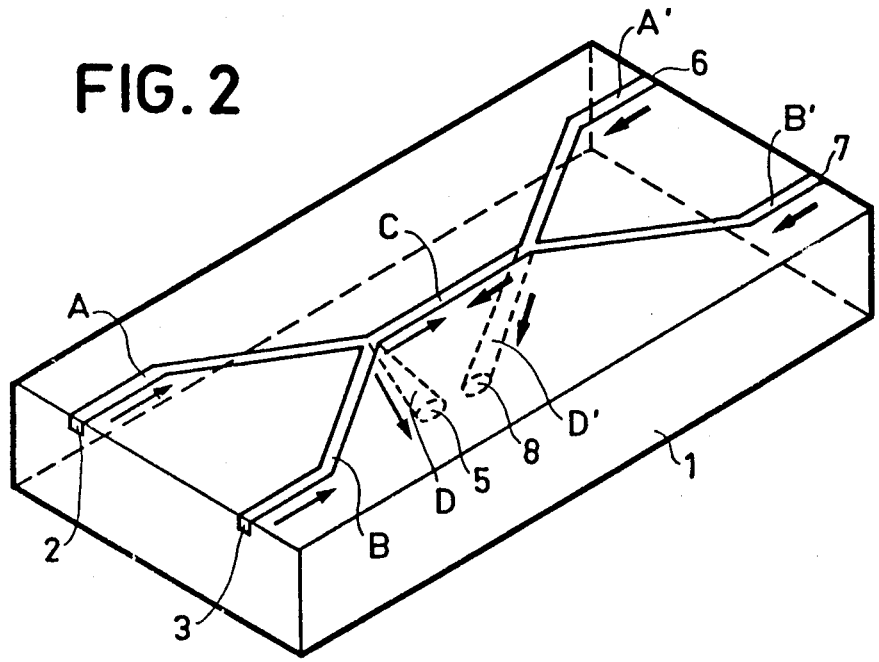

FIG. 2 shows an assembly combining two optical devices of the type illustrated in FIG. 1, fitted top to bottom, and incorporated within the same substrate 1. Input and output points of this device are symmetrical (2 and 3, 6 and 7). If waves entering guides A and B and propagated there are in phase, all the energy will be transferred to guide C. When light guided through this monomodal path C reaches the node, part is transferred into guide A' and the rest into guide B'. Energy separation between guides A' and B' can be regulated permanently by masking. If the node is perfectly symmetrical, separation will be fifty-fifty, and losses will be minimal if the node angle is slight. A different division of energy can be obtained by making the node asymmetrical.

When waves propagated in guides A and B are exactly out of phase, energy will not be transmitted to the central guide C, but along path D. The substrate, constituting a refractive medium, can be formed of a ferro-electric material. This ferro-electric material can be lithium niobate. Titanium can be added to the niobate to form the waveguides.

The device functions in exactly the same manner in the other direction, in other words when the input guides are A' and B'.

If metal is deposited on the surface of the substrate, the central guide C then acts as polarizer, allowing only waves on the optical mode determined by polarization to pass.

FIG. 3 shows a preferred embodiment of the device illustrated in FIG. 1. Three monomodal optical fibres E, F and G which perform the same function as the guides A, B and C in FIG. 1, converge in a Y-shaped node. This can be done, for example, by grinding the ends to ensure continuity between fibre cores to form the Y. The fourth path D is obtained by coupling another material 31 with the optical fibre sheath 9. Transmission occurs inside this sheath. The refractive index of the material 31, which encases the sheath, must be greater than that of the sheath material. The signal conveyed by the path D is picked up by a detector 13.

The device illustrated in FIG. 2 can also be obtained, by combining two of the separators illustrated in FIG. 3, top to bottom. With elliptically-shaped fibres, they will act as polarizers.

Figure 5:
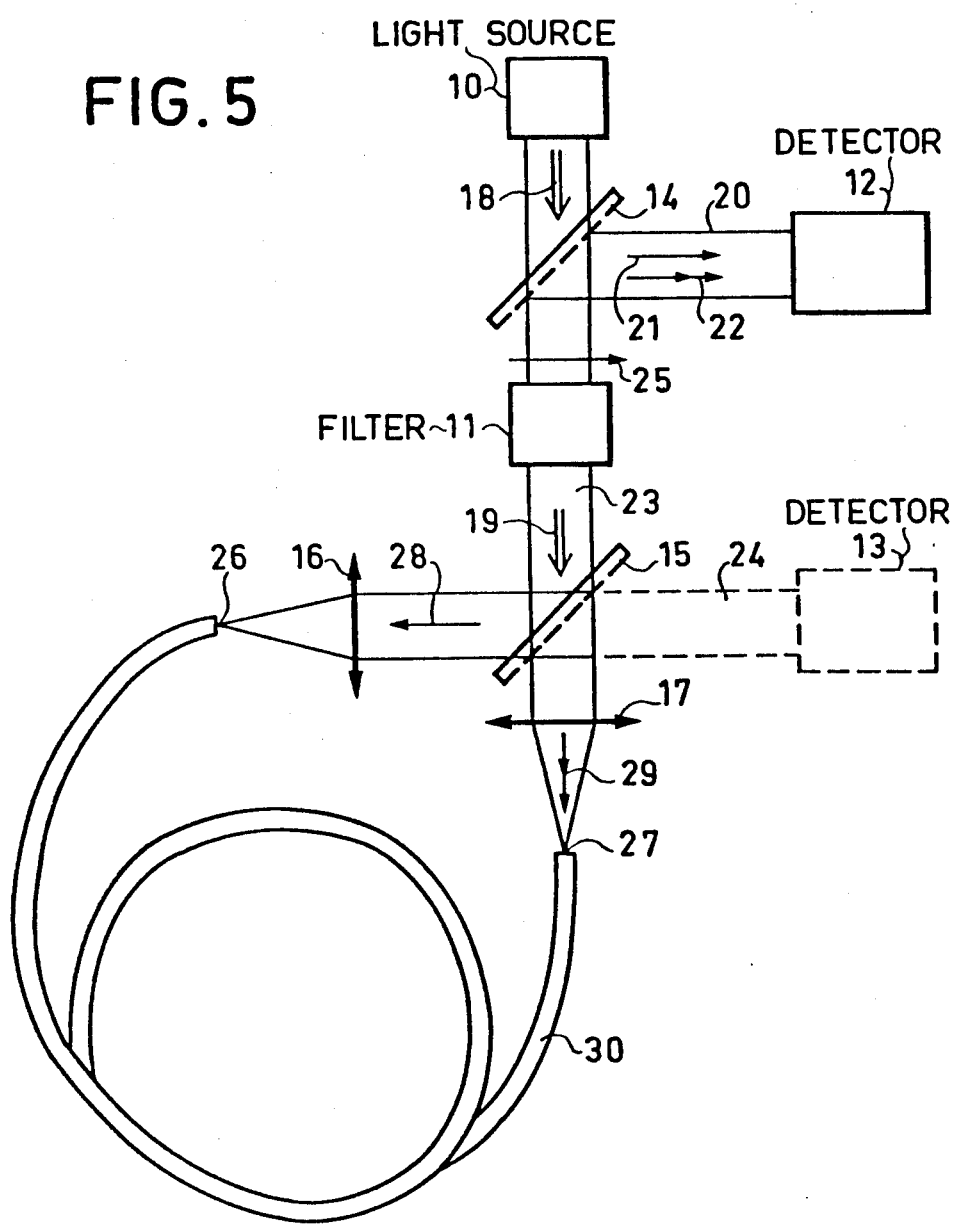
FIG. 5, shows a loop interferometer known in the prior art.

FIG. 5 shows the general layout of a loop interferometer known in the prior art. The optical trajectory is provided by monomodal optical fibres, but the main part of the instrument consists of conventional optical components.

The loop inlet is formed by the semi-transparent screen 15. The incident beam 19 from the light source 10 reaches the semi-transparent screen, after passing through the semi-transparent screen 14 and mode filter 11. The semi-conducting screen 15 reflects part of the incident beam 19 into the end 26 of an optical fibre 30, after focussing with a lens 16, and transmits the rest of the beam into the other end 27 of the fibre 30, after focussing with a lens 17.

The first beam 28 passes round the interferometer loop in one direction, while the other beam 29 passes round it in the opposite direction. Both beams then reach the semi-transparent screen 15. The first beam 28 is transmitted into the arm 23, and partly reflected into the arm 24. The same applies to the second beam. Two portions of the two beams consequently interfere in arms 23 and 24.

In the absence of non-reciprocal disturbances in the arm, interference will be destructive, and the signal picked up by the detector 13 will be nil, while interference in the arm 23 will be constructive, and the signal will be at a maximum level.

Insertion of a mode filter 11 into the input arm 23 is designed to make the interferometer strictly reciprocal, so that it is transversed by a wave contained within a signal optical mode.

After passing through the optical loop and being recombined by the separator screen, the fraction of optical energy obtained by interference of the two waves in the arm 23 presents a complex mode structure. Projection of this energy on the particular mode of the filter 11 is usually above zero. This fraction is attenuated, but contained within this single and clearly defined mode. In the absence of non-linear phenomena, and of course in the absence of actual non-reciprocal phenomena, the fraction of energy, contained, in this mode, on the way through and back, is linearly independent of the rest of the optical energy; it is exactly as if this remaining energy did not exist, and adequate singleness of mode exists for strict reciprocity of the device.

In fact, for most available mode filters, polarization of the wave passing through the filter is an additional degree of freedom: in other words, the filter is in fact bimodal.

When propagation constants, intensity distributions or losses in these two modes differ markedly, this is enough to separate them. Otherwise, one of them must be rejected by a polarizer.

Consequently, after passing through the fibre in opposite directions, the two beams are picked up by the arm 23, through the semi-transparent screen 15. They pass back through the mode filter and polarizer 25, and are separated from the incident beam 19 by the semi-transparent screen 14, which dispatches them partly into the arm 20, where the interference signal is picked up by the detector 12.

So there are two possible positions for the detector 13 or 12.

In a simplified interferometer, with the output arm 24 and detector 13, the separator 15, consisting here of a semi-transparent screen, can be replaced by the separator illustrated in FIG. 1. This produces the device illustrated in FIG. 4. Since junctions are direct, there is no further need for lenses. The detector 13 is positioned against one facet of the integrated circuit, in order to receive the signal conveyed by path D inside the medium.

Figure 6:
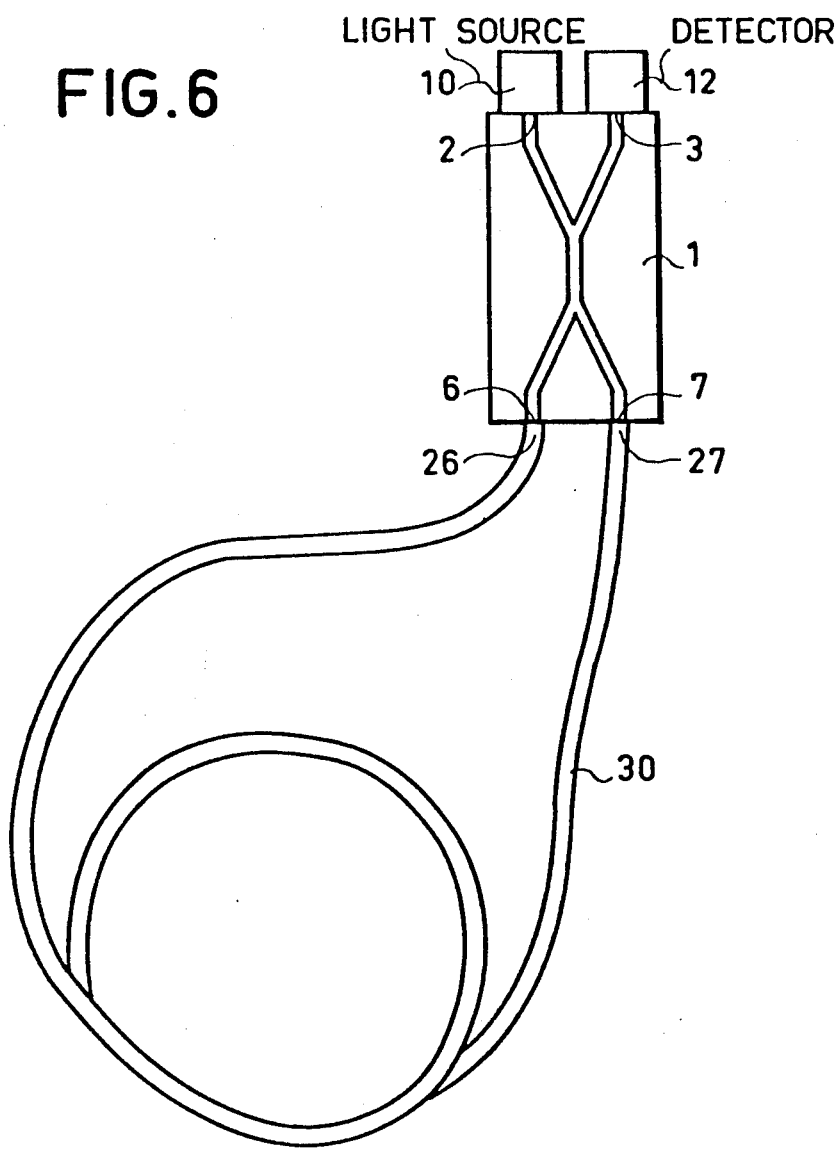
FIG. 6, shows the use of a device according to the present invention in a loop interferometer.

If the whole interferometer is considered, however, all the conventional optical components in FIG. 5 can be replaced by the integrated optical device illustrated in FIG. 2, resulting in the optical interferometer illustrated in FIG. 6, which operates on the principle described above.

Integrated optical junctions act as beam separators, a function previously performed by semi-transparent screens. Since the optical fibres connect directly with the guides, there is no need for lenses. If the metal is deposited on the surface of the substrate, the central wave-guide also acts as a polarizer, thereby restoring the complete layout of FIG. 5.

With certain materials, for example an electro-optical material, it is possible to obtain active and passive components of the guide structure on the same substrate. This allows the basic structure, which is passive, to be completed by adding active components, such as dephasers, which can make it easier to handle the signal.

Wave guides may be made with a lithium niobate substrate, using standard titanium-diffusion techniques. The width of the guides is such that they are monomodal at the relevant wavelength (e.g. 3 $\mu$m at 0.85 $\mu$m: GaAs laser). For instance, the axis of the crystal may be on the same plane as the surface on which the guides are constructed, although other orientations are possible; one very common layout involves a crystal with an axis perpendicular to the surface.

The length of the central wave-guide may range from a few millimeters to several centimeters, and is typically 5 mm. The toal angle of connection between guides A and B in FIG. 1 may be approximately 1°.

To allow the circuit to be connected without difficulty to the monomodal optical fibre, and to the laser source and detector, the guides on the input and output surfaces of the integrated optical circuits are approximately 500 micrometers apart. Output guides may be 5 millimeters long, to allow integrated phase modulators to be obtained, using the electro-optical effect in the lithium niobate substrate, by applying a suitable potential difference between two electrodes on each side of the wave guide.

What is claimed is:

1. An integrated optical device, comprising: an integrated hybrid junction having two input paths and two output paths formed as a Y-shaped assembly of three monomodal optical wave-guides joined at a node situated inside a refractive medium having a lower refractive index than the refractive index of the wave-guides, the ends of these three wave-guides forming two inputs and one output, a second output being formed of a portion of the refractive medium, connecting the node of the three wave-guides to an output facet of the refractive medium.

2. A device as in claim 1 further comprising a second hybrid junction, the first two outputs of each junction being connected with each other by a monomodal guide, which connects the respective nodes from which the different branches of each junction start.

3. A device as in claim 2 further comprising metal deposited on a surface of the refractive medium.

4. A device as in claim 1, in which the refractive medium is formed of a ferro-electric material.

5. A device as in claim 4 further comprising metal deposited on a surface of the refractive medium.

6. A device as in claim 4, in which the ferro-electric material is lithium niobate, and titanium is added to a portion of the lithium niobate to form the wave-guides.

7. A device as in claim 6 further comprising metal deposited on a surface of the refractive medium.

8. A device as in claim 1, further comprising electrodes positioned on each side of the wave-guides, for modulating light signals.

9. A device as in claim 8 further comprising metal deposited on a surface of the refractive medium.

10. A device as in claim 1 further comprising metal deposited on a surface of the refractive medium.

11. A device as in claim 1, in which the refractive medium comprises a sheath of monomodal optical fibres, the cores of said fibres forming the branches.

12. A device as in claim 11, in which the monomodal fibres are elliptical in shape.

13. A loop interferometer comprising: an optical fibre wave-guide for conducting in opposite directions, two fractions of a light beam emitted by a coherent light source and transmitted to a detector which is sensitive to their interferences after passing through the optical fibre, said interferometer further comprising a four branch separator in which the two ends of the optical fibre, light source and detector are directly connected to the four respective branches of said separator, said separator including:

two hybrid junctions, each hybrid junction having two input and two output paths and commmprising a Y-shapd assembly of three monomodal waveguides, one of which is common to both hybrid junctions, inside a refractive medium having a lower refractive index than that of the waveguides, the ends of the three waveguides forming two inputs and an output for each junction, the outputs of the two junctions flowing into said common waveguide, a second output for each junction being formed of a portion of the refractive medium connecting the node of the junction to an output facet of the refractive medium.

* * * * *